United States Patent
Li et al.

(10) Patent No.: US 10,367,862 B2
(45) Date of Patent: Jul. 30, 2019

(54) LARGE-SCALE PAGE RECOMMENDATIONS ON ONLINE SOCIAL NETWORKS

(71) Applicant: Facebook, Inc., Menlo Park, CA (US)

(72) Inventors: Jun Li, Sammamish, WA (US); Fei Guo, Redmond, WA (US); Bradley Green, Snohomish, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/367,057

(22) Filed: Dec. 1, 2016

(65) Prior Publication Data
US 2017/0085607 A1   Mar. 23, 2017

Related U.S. Application Data

(63) Continuation of application No. 13/942,486, filed on Jul. 15, 2013, now Pat. No. 9,552,055.

(51) Int. Cl.
*G06F 17/30* (2006.01)
*G06F 7/00* (2006.01)
(Continued)

(52) U.S. Cl.
CPC ............ *H04L 65/403* (2013.01); *G06F 3/00* (2013.01); *G06F 16/248* (2019.01);
(Continued)

(58) Field of Classification Search
CPC ........................... G06Q 50/01; G06Q 30/0224
See application file for complete search history.

(56) References Cited

U.S. PATENT DOCUMENTS

| 8,706,739 | B1 * | 4/2014 | Song ................ G06F 17/30867 707/748 |
| 2005/0149502 | A1 * | 7/2005 | McSherry ......... G06F 17/30867 |

(Continued)

FOREIGN PATENT DOCUMENTS

JP    2011-257955 A    12/2011

OTHER PUBLICATIONS

Notice of Acceptance for AU Patent Application No. 2014290339 dated Jun. 20, 2017.
(Continued)

*Primary Examiner* — Nicholas R Taylor
*Assistant Examiner* — Ho T Shiu
(74) *Attorney, Agent, or Firm* — Baker Botts L.L.P.

(57) ABSTRACT

In one embodiment, a method includes accessing user-concept scores for a first set of users, wherein each user-concept score is associated with a user-concept pair; calculating recommended user-concept scores for a subset of user-concept pairs in a second set of users. The first set of users may be discrete from the second set of users. A recommendation-algorithm may compute the recommended user-concept scores for a user-concept pair by optimizing an objective function comprising a plurality of predicted rating functions. Each predicted rating function may be determined using a user score, a concept score, a user-bias value associated with the user, as well as a concept-bias value associated with the concept. Finally, the method may include sending recommendations for one or more concepts based on the recommended user-concept scores for the second set of users.

23 Claims, 4 Drawing Sheets

(51) Int. Cl.

| | | |
|---|---|---|
| *G06Q 30/00* | (2012.01) | |
| *H04L 29/06* | (2006.01) | |
| *G06F 16/248* | (2019.01) | |
| *G06F 16/2457* | (2019.01) | |
| *G06F 3/00* | (2006.01) | |
| *G06Q 50/00* | (2012.01) | |
| *H04N 21/00* | (2011.01) | |
| *G06Q 30/02* | (2012.01) | |
| *H04L 29/08* | (2006.01) | |
| *G06Q 10/10* | (2012.01) | |
| *G06Q 10/06* | (2012.01) | |
| *H04W 4/21* | (2018.01) | |
| *G06F 16/24* | (2019.01) | |
| *G06F 16/28* | (2019.01) | |
| *G06F 16/903* | (2019.01) | |
| *H04N 21/25* | (2011.01) | |
| *H04N 21/4788* | (2011.01) | |

(52) U.S. Cl.
CPC ... *G06F 16/24578* (2019.01); *G06Q 30/0269* (2013.01); *G06Q 50/01* (2013.01); *H04N 21/00* (2013.01); *G06F 16/24* (2019.01); *G06F 16/282* (2019.01); *G06F 16/903* (2019.01); *G06Q 10/0633* (2013.01); *G06Q 10/10* (2013.01); *G06Q 30/02* (2013.01); *H04L 67/02* (2013.01); *H04L 67/306* (2013.01); *H04N 21/252* (2013.01); *H04N 21/4788* (2013.01); *H04W 4/21* (2018.02)

(56) References Cited

U.S. PATENT DOCUMENTS

| | | | | |
|---|---|---|---|---|
| 2005/0210025 | A1* | 9/2005 | Dalton | G06F 17/30867 |
| 2012/0166532 | A1* | 6/2012 | Juan | G06Q 50/01 |
| | | | | 709/204 |
| 2012/0221581 | A1* | 8/2012 | Narayanan | G06F 17/30958 |
| | | | | 707/748 |
| 2013/0073983 | A1 | 3/2013 | Rasmussen | |
| 2013/0124449 | A1 | 5/2013 | Pinckney | |
| 2013/0124538 | A1 | 5/2013 | Lee | |
| 2014/0025702 | A1* | 1/2014 | Curtiss | G06Q 50/01 |
| | | | | 707/769 |
| 2014/0074545 | A1* | 3/2014 | Minder | G06Q 50/01 |
| | | | | 705/7.27 |
| 2014/0129500 | A1* | 5/2014 | Nice | G06N 5/02 |
| | | | | 706/46 |

OTHER PUBLICATIONS

Notice of Allowance from Korean Intellectual Property Office for Application No. 10-2016-7003751, dated Dec. 28, 2017.

* cited by examiner

LARGE-SCALE PAGE RECOMMENDATIONS ON ONLINE SOCIAL NETWORKS

PRIORITY

This application is a continuation under 35 U.S.C. § 120 of U.S. patent application Ser. No. 13/942,486, filed 15 Jul. 2013.

TECHNICAL FIELD

This disclosure generally relates to online social networks.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Matrix factorization is a factorization of a matrix into a product of matrices. Low-rank matrix factorizations are effective tools for analysis of dyadic data, which aims at discovering and capturing the interactions between two entities. Successful applications include topic detection and keyword search (where the corresponding entities are documents and terms), news personalization (users and stories), and recommendation systems (users and items). In large applications, these problems can involve matrices with millions of rows (e.g., distinct customers), millions of columns (e.g., distinct items), and billions of entries (e.g., interactions between customers and items).

SUMMARY OF PARTICULAR EMBODIMENTS

In particular embodiments, the social-networking system may identify content objects to recommend or advertise to large numbers of users of an online social network. Such recommendations may be identified in order to optimize the conversion rate of content presented to users. Content recommendations may be determined by optimizing an objective function comprising predicted rating functions, wherein each rating function (for a user-concept pair) comprises a dot product of a user-score vector and a concept-score vector, and bias values. However, computing the dot product of these vectors for all users of the online social network directly may be prohibitive from a time and processing perspective. In particular embodiments, the social-networking system may predict interests of a user through collaborative filtering based on connections to entities provided by the user, and leverage these interests to make content recommendations. The online social network may be associated with more than a billion users and many millions of concepts (e.g., places, websites, entities, resources, etc.), where it may be desirable to recommend these users and concepts to other users. Instead of using rating data from all users and all concepts, which may be an unfeasibly large data set, the social-networking system may use rating data from only a sample of users with respect to all concepts associated with the online social network, and use this limited data set to calculate the concept traits. These concept traits may then be fixed and used to calculate user traits for all remaining users of the online social network. After getting user traits and concept traits, instead of calculating the scores directly for each user-concept pair, the social-networking system may use random projection to scope down the concepts for every user. It may determine the most similar concepts for every concept based on cosine similarity distance of the concept trait vectors, and then use that as source to provide suggestions to users (e.g., concepts most similar to one the user has previously "liked" or otherwise interacted with).

DESCRIPTION OF EXAMPLE EMBODIMENTS

Figure 1:
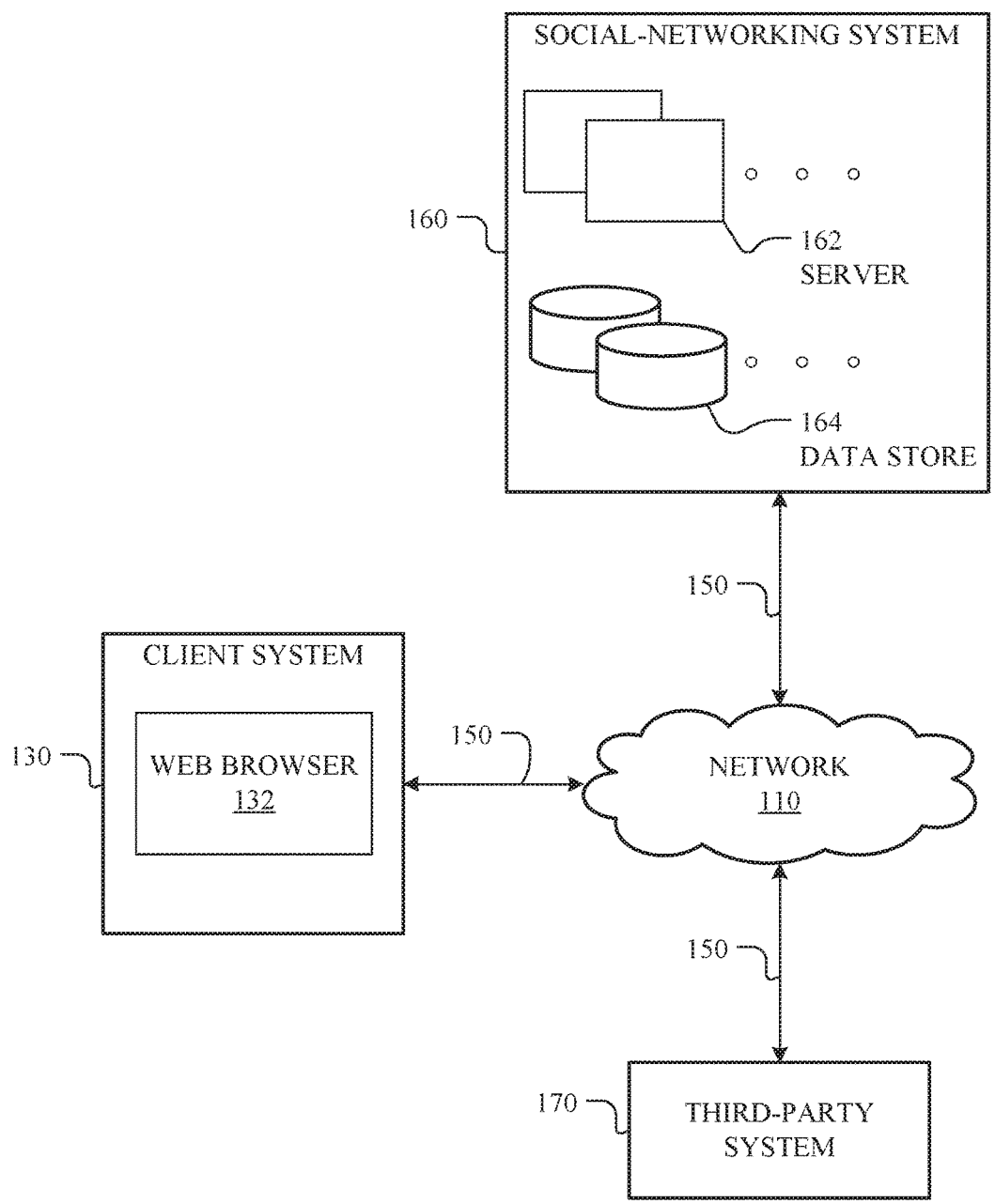
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
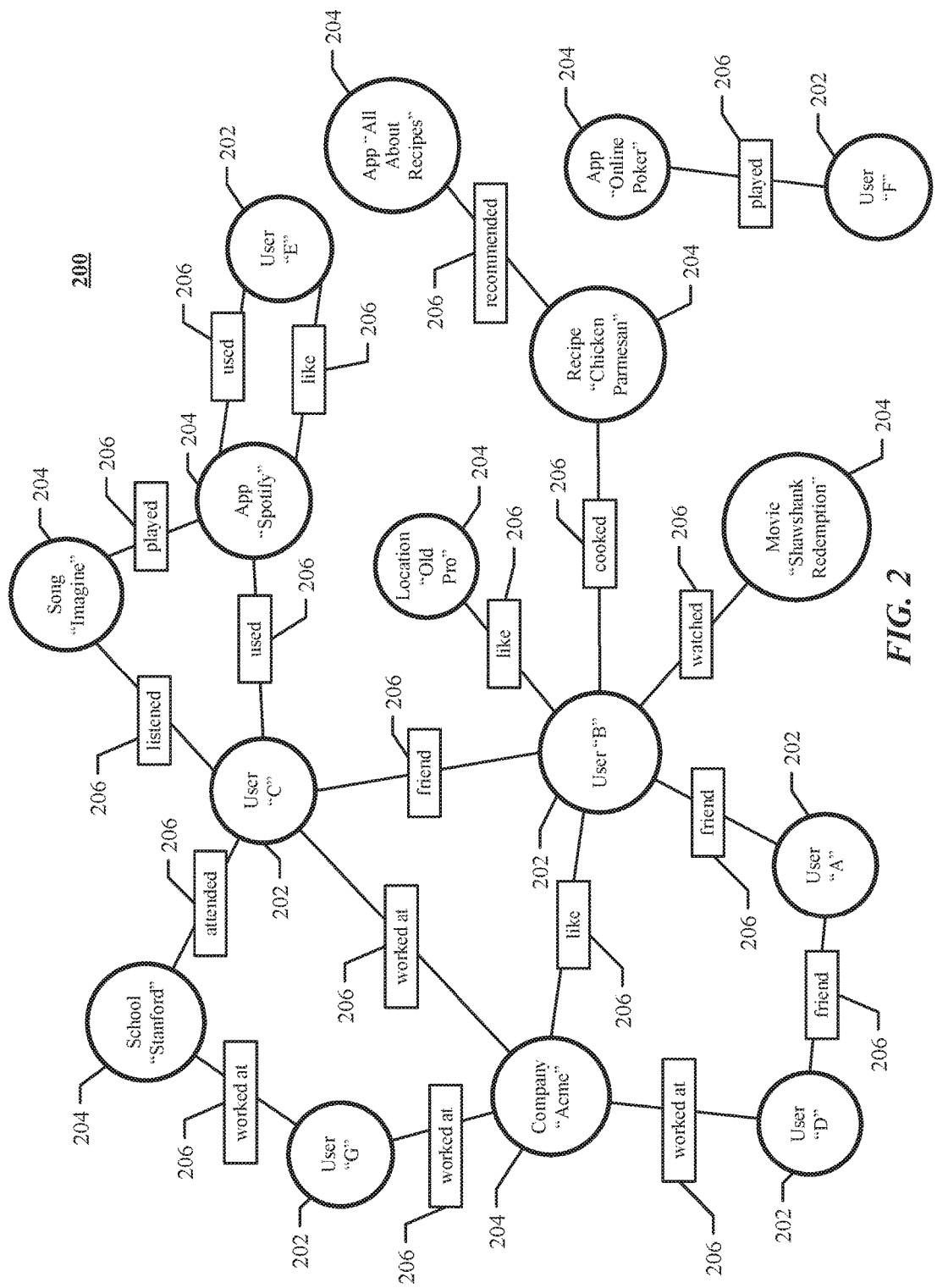
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204.

In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may identify content objects to recommend or advertise to large numbers of users of an online social network. These content objects may be user-profile pages, concept-profile pages, multimedia content, advertisements, or any other suitable objects associated with the online social network. Such recommendations may be identified in order to optimize conversion rate (i.e., number of interactions/clicks vs. number of impressions) of content presented to users. Content recommendations may be computed by optimizing an objective function comprising predicted rating functions, wherein each rating function for a user-concept pair (u,i) comprises a dot product of a user-score vector P(u) and a concept-score vector Q(i), and bias values. However, directly computing of the dot product of these vectors for all users of the online social network may be prohibitive from a time and processing perspective. Thus, it may be advantageous to provide a more efficient way to determine targeted and relevant concept recommendations to users based on each user's personal taste. In particular embodiments, social-networking system 160 may predict interests of a user through collaborative filtering based on connections to entities provided by the user (e.g., user-generated edge connections between user nodes 202 and other nodes of social graph 200, which may be referred to as rating data), and leverage these interests to make content recommendations. The challenge is that at the online social network may be associated with more than a billion users and many millions of concepts (corresponding to user nodes 202 and concept nodes 204, respectively), where it may be desirable to recommend these users and concepts (e.g., recommend their corresponding profile pages) to other users. Due to the size of the social graph 200, it may be prohibitive to use standard dimension reduction techniques such as singular value decomposition (SVD) to calculate user recommendations due to time and computational power constraints. Even if the system can get a low-dimensional approximation of users and recommendations, the cost of calculating the score of all possible user-concept pairs may be extremely high. As an example and not by way of limitation, for a social graph 200 comprising over 1 billion user nodes 202 and 5 millions concept nodes 204, it would take over 5 quadrillion ($5 \times 10^{15}$) computations to analyze all user-concept pairs, which may be infeasible to complete within a reasonable timeframe. Even if all concepts can be scored on an individual basis, serving recommendations from such a large set requires large-scale infrastructure. Therefore, instead of using rating data from all users and all concepts, which may be an unfeasibly large data set, social-networking may use rating data from only a sample of users (e.g., 1%) with respect to all concepts associated with the online social network, and use this limited data set to calculate all concept traits. These concept traits may then be fixed and used to calculate user traits for all remaining users of the online social network. After getting user traits and concept traits, instead of calculating the scores directly for each user-concept pair, social-networking system 160 may use random projection to scope down the concepts for every user. It may determine the most similar concepts for every concept based on cosine similarity distance of the concept trait vectors, and then use that as source to provide suggestions to users (e.g., concepts most similar to one the user has previously "liked" or otherwise interacted with). Although this disclosure describes identifying particular content objects to recommend or advertise in a particular manner, this disclosure contemplates identifying any suitable content objects to recommend or advertise in any suitable manner.

In particular embodiments, social-networking system 160 may access user-concept scores for a first set of user nodes 202 of the plurality of nodes, respectively. Each user-concept score may be with respect to particular user-concept pairs comprising a user node 202 from the first set of user nodes that is connected by an edge 206 to a concept node 204 from the plurality of concept nodes. The first set of user nodes 202 may comprise a representative number of user nodes 202 corresponding to a representative sample of users of the online social network. As an example and not by way of limitation, the first set of user nodes 202 may comprise approximately 1% of the user nodes 202 of the plurality of user nodes 202 of social graph 200 (although, any other suitable fraction may be used, such as, for example, 0.1%, 1%, 2%, 5%, 10%, or another suitable fraction of the users of the online social network). In connection with identifying and selecting user sets, particular embodiments may utilize one or more systems, components, elements, functions, methods, operations, or steps disclosed in U.S. patent application Ser. No. 13/939,093, filed 10 Jul. 2013, which is incorporated by reference. In particular embodiments, social-networking system 160 may access a ratings matrix R representing the user-concept scores for the first set of user nodes 202. Rating matrix R may comprise ratings of users to concepts, where R(u,i) may present the rating from the user node u to the concept node i. Ratings matrix R may be generated by self-reported connections between users and entities (e.g., edge 206 connections when a user "likes" a concept). In the context of social graph 200, nodes connected by an edge 206 may be considered to have a rating/score with respect to the node pair, while unconnected nodes may have no score or a null score with respect to the node pair. The ratings matrix R may be extremely spare in that the typical user may have rated/liked very few concepts relative to the total number of concepts associated with the online social network. In other words, the typical user node 202 may be connected by edges 206 to relatively few concept nodes 204. But a ratings matrix R for all users may have a very large dimensionality if there are, for example, over a billion users and millions of concepts. Based on the ratings matrix R, social-networking system 160 may then determine a user matrix P, wherein the user matrix P comprises a plurality of user-score vectors P(u) for each user node u of the first set of users nodes 202. Social-networking system 160 may also determine a concept matrix Q based on the ratings matrix R, wherein the concept matrix Q comprises a plurality of concept-score vectors Q(i) for each concept node i of the plurality of concepts nodes. As an example and not by way of limitation, social-networking system 160 may take 1% of users and all concepts, collect interaction history (e.g., edge-type information regarding connections user nodes 202 to concept nodes 204) between the 1% users and concepts as training data, and use a distributed stochastic gradient descent algorithm to calculate user trace vectors for all 1% users and concept trace vectors for all concepts, and biases for all user-concept pairs. Although this disclosure describes accessing particular user-concept scores in a particular manner, this disclosure contemplates accessing any suitable user-concept scores in any suitable manner.

In particular embodiments, social-networking system 160 may generate a recommendation-algorithm for estimating recommended user-concept scores for all user-concept pairs in the first set of user nodes 202 and the plurality of concept nodes 204. The recommended user-concept scores may be based on the accessed user-concept scores, as described previously. In particular embodiments, social-networking system 160 may use a matrix factorization model to allow for the computation of a recommendation score for every user-concept pair (u,i) by use of user traits and concept traits. As an example and not by way of limitation, social-networking system 160 may calculate a recommendation score from a ratings matrix R. Social-networking system 160 may access a user matrix P based on ratings matrix R, where user matrix P comprises a plurality of user-score vectors P(u) (also called user trait vectors) for each user node u of the first set of user nodes 202, wherein each user node u is associated with a user-bias vector $B_u(u)$. In other words, in user matrix P each row may be indexed by a user and the columns may be values in a trait space. The trait space of user matrix P may have dimension k. Social-networking system 160 may then access a concept matrix Q based on ratings matrix R, where the concept matrix Q comprises a plurality of concept-score vectors Q(i) (also called concept trait vectors) for each concept node i of the plurality of concepts, wherein each concept node i is associated with a concept-bias vector $B_i(i)$. In other words, concept matrix Q is a matrix where each column is indexed by a concept and the rows are values in a trait space. The trait space of concept matrix Q may have dimension k as well. The columns of concept matrix Q are referenced by concept node i. Every user may have a bias value defined by user-bias vector $B_u(u)$, where $B_u$ is a vector of all biases of users. Similarly, every concept may have a bias value defined by concept-bias vector $B_i(i)$, where $B_i$ is a vector of all biases of concepts. Social-networking system 160 may then generate an estimator matrix R' representing recommended user-concept scores for the first set of user nodes, wherein the rating of user node u to concept node i is $R'(u,i)=P(u) \cdot Q(i)+B_u(u)+B_i(i)$ for each user-concept pair (u,i). In particular embodiments, social-networking system 160 may determine the user matrix P, the user-score vectors P(u) for each user node u, the concept matrix Q, and the concept-score vectors Q(i) for each concept node i using distributed stochastic gradient descent (DSGD). As an example and not by way of limitation, the implementation algorithm used by social-networking system 160 may use distributed stochastic gradient descent to find user matrix P, concept matrix Q, user-bias vector $B_u(u)$, and concept-bias vector $B_i(i)$ such that the score/rating of user node u and concept node i generated by the formula for R'(u,i) most closely matches R(u,i). The algorithm may be run on a sample of data in a pre-training phase, and from those results it may then be extrapolated to all data. Final scores/ratings may be calculated using random projection, and the top scoring concepts may then be stored for use by the recommendation processes of social-networking system 160. User matrix P and concept matrix Q do not need to be trained by DSGD for all users and all concepts. Instead, for a sample of users and all concepts, a full run of DSGD may be run to learn user matrix P and concept matrix Q from this sample. In this way concept matrix Q and concept-bias vector $B_i(i)$ may be learned from a smaller sample. These values for the concept traits and concept offsets may then be fixed. To calculate user matrix P for all users, repeated samples may then be chosen from the set of users without replacement. Each sample may then be used to compute a sub-matrix of user matrix P corresponding to the users in the sample. This sub-matrix may be calculated by applying DSGD to the optimization process described with respect to matrix factorization above, holding concept matrix Q and concept-bias vector $B_i(i)$ fixed from pre-training. In the first training step, social-networking system 160 may optimize to discover user-score vectors P(u) for each user node u, and concept-score vectors Q(i) for each concept node i on a random sample of users P and all items Q. The concept traits can then be fixed, and social-networking system 160 may then run numerous processes on the partitions of the user base to calculate P(u) for that user base. These processes may be run in parallel, and each parallel run may be done by running DSGD on a cluster of machines. As an example and not by way of limitation, social-networking system may fix the concept trace vectors and all biases, and use the distributed stochastic gradient descent algorithm to train with data for the remaining 99% of users of the online social network (assuming the first set comprised approximately 1% of users), and calculate user trace vectors for all users, concept trace vectors for all concepts, and biases for all user-concept pairs. Although this disclosure describes generating particular recommendation algorithms in a particular manner, this disclosure contemplates generating any suitable recommendation algorithm in any suitable manner.

In particular embodiments, social-networking system 160 may calculate recommended user-concept scores for a second set of user nodes 202 of the plurality of nodes. The first set of user nodes 202 may be discrete from the second set of user nodes 202. The recommended user-concept score may be, for example, an affinity coefficient (as discussed below), or a factor used when determining social-graph affinity. In particular embodiments, the second set of user nodes 202 may comprise substantially all remaining user nodes 202 of social graph 200. Social-networking system 160 may take the concept traits determined by a run of optimization on the first set of users nodes 202, as described previously, and use these to compute user traits for all other partitions of users of the online social network. The second set of user nodes 202 may be divided into a plurality of discrete sets of users. As an example and not by way of limitation, the second set of user nodes 202 may comprise approximately 100% of the user nodes 202 of social graph 200 not included in the first set of user nodes 202. For every user and every concept, social-networking system 160 may have a vector that represents the user's interest and a vector that represents the concept's traits. As described above, along with the offsets, social-networking system 160 may quantitatively compute how much a concept matches a user's interest by taking an inner product of the two vectors. For concept recommendations, social-networking system 160 may compute that score for all concepts for a user, rank all concepts based on that score, and pick the top n results. However, as discussed previously, with over one billion users and many million of concepts, there may be trillion computations required to estimate scores for all concepts with respect to all users, which may be infeasible to complete within a reasonable time frame. This problem may be solved using random projection (hashing). As an example and not by way of limitation, social-networking system 160 may use random projection (hashing) to project the user trace vectors and concept trace vectors to a plurality of sub-spaces (or buckets), such that in each sub-space, the user and concept trace vectors have high cosine similarity (similar bit-map, or roughly pointing in the same direction). Since the user and concept trace vectors may have high cosine similarity in a bucket, the dot product of user and concepts trace vectors, and thus computation of the rating functions, may be carried out. The random projection may result in only a small loss (e.g., 2%) of conversion rate. In particular embodiments, when calculating recommended user-concept scores for the second set of user nodes 202 of the plurality of nodes, social-networking system 160 may use a random projection process. Social-networking system 160 may calculate, for each user node of the second set of user nodes, a plurality of user-bias vectors $B_u(u)$, wherein each user-bias vector $B_u(u)$ is associated with a user node u of the second set of user nodes. Social-networking system 160 may then map the plurality of user-bias vectors $B_u(u)$ and a plurality of concept-bias vectors $B_i(i)$ to a plurality of sub-spaces using random hash functions, wherein each concept-bias vector $B_i(i)$ is associated with a concept node i of the plurality of concept nodes. Social-networking system 160 may then calculate, for each sub-space, user-concept scores for the user node u of the second set of user nodes associated with the user-bias vector $B_u(u)$ mapped to the sub-space, wherein the user-concept scores are equal to $B_u(u) \cdot B_i(i)$ for the user-bias vector $B_u(u)$ and the concept-bias vector $B_i(i)$ mapped to the sub-space. As an example and not by way of limitation, social-networking system 160 may define a series of random hash functions and use them to map each user interest vector and each concept interest vector to a sub-space with a sub-space ID. This process is similar to locality sensitive hashing (LSH), and provides a low-dimensional approximation of the concept and user traits. Social-networking system 160 may then compute, for each sub-space, the inner products for all user and all concepts' vectors within the same sub-space. After this process, for any particular user and any particular concept, social-networking system 160 may be able to calculate a recommended user-concept score. For every user, social-networking system 160 may rank all the concepts whose vectors are in the same sub-spate as the user's vector based on the score. The top n concepts for that user may then be stores as recommendations for the user. In particular embodiments, this process may be repeated at specified time intervals so that new or updated recommendations may be generated for each user. Although this disclosure describes calculating particular recommended user-concept scores in a particular manner, this disclosure contemplates calculating any suitable recommended user-concept scores in any suitable manner.

In particular embodiments, social-networking system 160 may send recommendations for one or more concept nodes 204 to one or more users corresponding to the user nodes 202 of the second set of user nodes 202 based on the calculated recommended user-concept scores for the second set of user nodes 202. Based on the calculated ratings functions, social-networking system 160 may then rank the concepts with respect to each user based on the scores and store the ranking (e.g., a list of 50 top-ranked concept-profile pages) for the each user. As an example and not by way of limitation, social-networking system 160 may recommend one or more pages (e.g., user-profile pages or concept-profile pages) to users of the online social network. After calculating recommended user-concept scores, social-networking system may, for example, send a recommendation or advertisement to a user such as, "Pages you may like", "People you should follow", or "Groups you should join", where the recommendation or advertisement comprises a reference a node based on the recommended user-concept score with respect to user receiving the recommendation or advertisement and the concept being referenced. As another example and not by way of limitation, the calculated recommended-user-concept scores may be used to calculate social-graph affinity or affinity coefficients (as described below), which may be used as a factor when providing recommendations, advertisements, search results, or other suitable content for a user of an online social network. Although this disclosure describes sending particular recommendations in a particular manner, this disclosure contemplates sending any suitable recommendations in any suitable manner.

Figure 3:
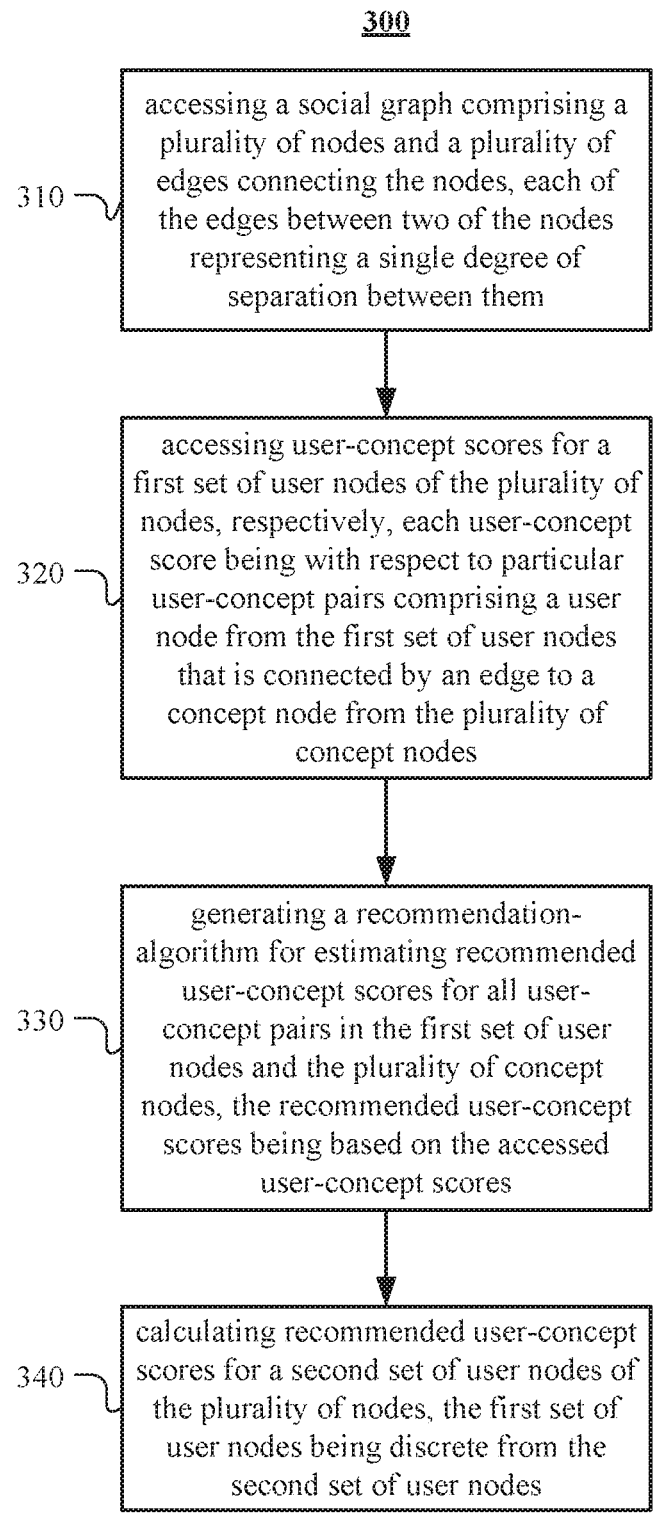
FIG. 3 illustrates an example method for determining recommended content on an online social network.

FIG. 3 illustrates an example method 300 for determining recommended content on an online social network. The method may begin at step 310, where social-networking system 160 may access a social graph comprising a plurality of nodes and a plurality of edges 206 connecting the nodes. Each of the edges 206 between two of the nodes may represent a single degree of separation between them. The nodes may comprise a plurality of user nodes 202 corresponding to a plurality of users associated with an online social network, respectively. The nodes may also comprise a plurality of concept nodes 204 corresponding to a plurality of concepts associated with the online social network, respectively. At step 320, social-networking system 160 may access user-concept scores for a first set of user nodes 202 of the plurality of nodes, respectively. Each user-concept score may be with respect to particular user-concept pairs comprising a user node 202 from the first set of user nodes that is connected by an edge 206 to a concept node 204 from the plurality of concept nodes. At step 330, social-networking system 160 may generate a recommendation-algorithm for estimating recommended user-concept scores for all user-concept pairs in the first set of user nodes 202 and the plurality of concept nodes 204. The recommended user-concept scores may be based on the accessed user-concept scores. At step 340, social-networking system 160 may calculate recommended user-concept scores for a second set of user nodes 202 of the plurality of nodes. The first set of user nodes 202 may be discrete from the second set of user nodes 202. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for determining recommended content on an online social network including the particular steps of the method of FIG. 3, this disclosure contemplates any suitable method for determining recommended content on an online social network including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

Figure 4:
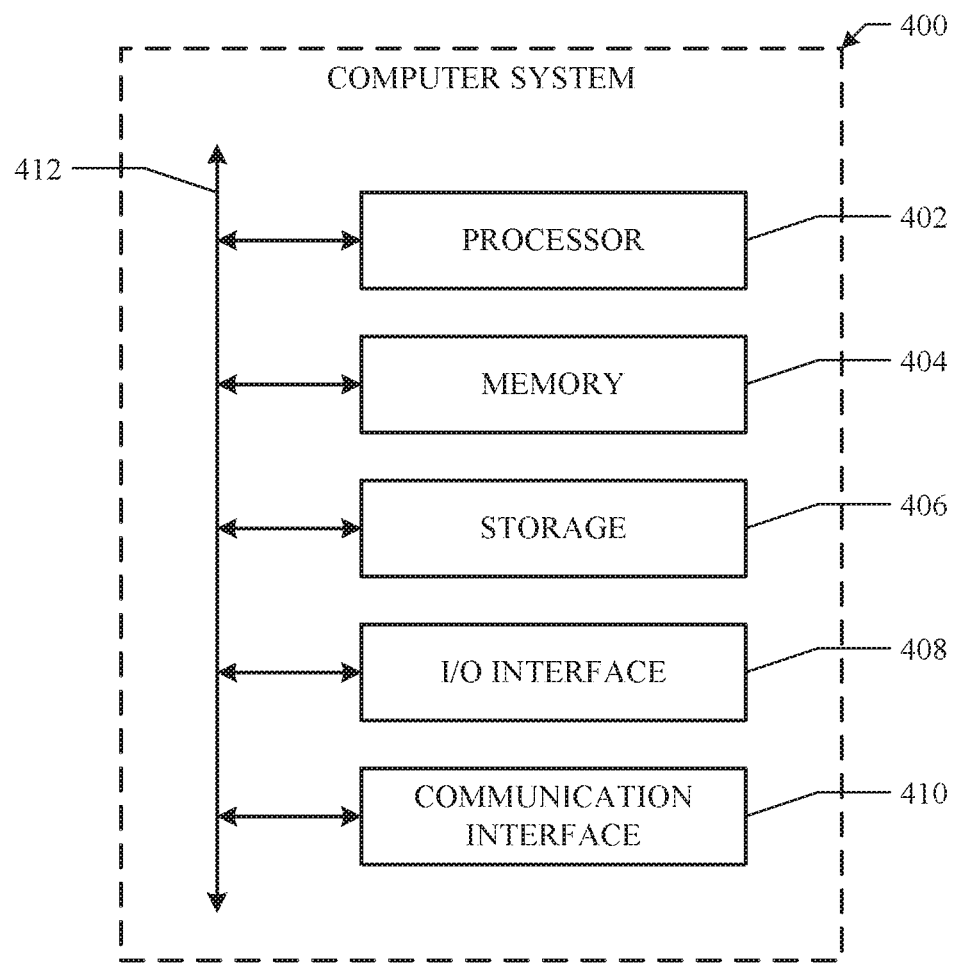
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more processors of one or more computing systems:

retrieving, by one or more of the processors from one or more computer storage media, user-concept scores for a first set of users of a plurality of users, wherein the user-concept scores are associated with previous social network activities of the first set of users of the plurality of users, and wherein each user-concept score is associated with a user-concept pair that comprises a first user from the first set of users and a concept from a plurality of concepts;

generating, by one or more of the processors, a data structure comprising a concept matrix Q based on the accessed user-concept scores of the first set of users, wherein the concept matrix Q comprises a plurality of concept trait vectors corresponding to the plurality of concepts, and wherein the concept matrix Q is fixed after being determined;

selecting, by one or more of the processors and from the data structure, a subset of concepts of the concept matrix Q based on a similarity metric of the plurality of concept trait vectors of the concept matrix Q, wherein the subset of concepts is associated with one or more previous social network activities of one or more users of a second set of users, and wherein the second set of users is discrete from the first set of users;

generating, by one or more of the processors, recommendations based on recommended user-concept scores for a subset of user-concept pairs in the second set of users of the plurality of users and the plurality of concepts based on the subset of concepts of the concept matrix Q determined from the first set of users, wherein the subset of user-concept pairs in the second set of users is a random subset of user-concept pairs, wherein a recommendation-algorithm computes the recommended user-concept scores for a user-concept pair by optimizing an objective function comprising a plurality of predicted rating functions, wherein each predicted rating function is determined using a user score, a concept score, a user-bias value associated with a second user in the second set of users, and a concept-bias value associated with the concept; and sending, to one or more client systems of one or more users of the second set of users, the recommendations for one or more concepts based on the recommended user-concept scores for the second set of users.

2. The method of claim 1, wherein retrieving the user-concept scores for the first set of users comprises:

accessing a ratings matrix R representing the user-concept scores for the first set of users; and determining a user matrix P based on the ratings matrix R, wherein the user matrix P comprises a plurality of user-score vectors P(u) for each user u of the first set of users; and determining the concept matrix Q based on the ratings matrix R, wherein the concept matrix Q comprises a plurality of concept-score vectors Q(i) for each concept i of the plurality of concepts.

3. The method of claim 2, wherein the user matrix P, the user-score vectors P(u) for each user u, the concept matrix Q, and the concept-score vectors Q(i) for each concept i are determined using distributed stochastic gradient descent.

4. The method of claim 1, wherein generating the recommendations based on the recommended user-concept scores further comprises:

accessing a user matrix P comprising a plurality of user-score vectors P(u) for each user u of the first set of users, wherein each user u is associated with a user-bias vector $B_u(u)$;

accessing the concept matrix Q comprising a plurality of concept-score vectors Q(i) for each concept i of the plurality of concepts, wherein each concept i is associated with a concept-bias vector $B_i(i)$; and generating an estimator matrix R' representing recommended user-concept scores for the first set of users, wherein $R'(u,i)=P(u) \cdot Q(i)+B_u(u)+B_i(i)$ for each user-concept pair.

5. The method of claim 1, wherein generating the recommendations based on the recommended user-concept scores further comprises:

calculating, for each user of the second set of users, a plurality of user-bias vectors $B_u(u)$, wherein each user-bias vector $B_u(u)$ is associated with a user u of the second set of users;

mapping the plurality of user-bias vectors $B_u(u)$ and a plurality of concept-bias vectors $B_i(i)$ to a plurality of sub-spaces using one or more random hash functions, wherein each concept-bias vector $B_i(i)$ is associated with a concept i of the plurality of concepts; and calculating, for each sub-space, user-concept scores for the user u of the second set of users associated with the user-bias vector $B_u(u)$ mapped to the sub-space, wherein the user-concept scores are equal to $B_u(u) \cdot B_i(i)$ for the user-bias vector $B_u(u)$ and the concept-bias vector $B_i(i)$ mapped to the sub-space.

6. The method of claim 5, wherein mapping the plurality of user-bias vectors $B_u(u)$ and the plurality of concept-bias vectors $B_i(i)$ to a plurality of sub-spaces using the random hash functions comprises using a random projection process to project the plurality of user-bias vectors $B_u(u)$ and a plurality of concept-bias vectors $B_i(i)$ to the plurality of sub-spaces.

7. The method of claim 1, wherein generating the recommendations based on the recommended user-concept scores for the second set of users is performed on a plurality of discrete sets of users from the second set of users using distributed stochastic gradient descent on the one or more processors of the one or more computing systems.

8. The method claim 1, wherein the first set of users comprises a representative sample of users of an online social network.

9. The method claim 1, wherein the first set of users comprises approximately 1% of the users of an online social network.

10. The method of claim 1, wherein the second set of users comprises substantially all remaining users of an online social network.

11. The method of claim 1, wherein the second set of users comprises approximately 100% of the users of an online social network minus the first set of users.

12. The method of claim 11, wherein the second set of users is divided into a plurality of discrete sets of users.

13. The method of claim 1, further comprising:

accessing a social graph comprising a plurality of nodes and a plurality of edges connecting the nodes, each of the edges between two of the nodes representing a single degree of separation between them, the nodes comprising:

a plurality of user nodes corresponding to the plurality of users, respectively; and a plurality of concept nodes corresponding to the plurality of concepts, respectively.

14. The method of claim 13, further comprising calculating, for each user-concept pair, an affinity coefficient between the user node and the concept node that correspond to the respective user-concept pair, wherein the affinity coefficient is based at least in part on the recommended user-concept score for the respective user-concept pair.

15. The method of claim 14, wherein sending the recommendations for one or more concepts is further based on the calculated affinity coefficients.

16. The method of claim 13, wherein each edge of the plurality of edges comprises a particular edge-type corresponding to a particular action a third user performed with respect to a concept.

17. The method of claim 16, further comprising calculating, for each user-concept pair, an affinity coefficient between the user node and the concept node that correspond to the respective user-concept pair, wherein the affinity coefficient is based at least in part on the particular edge-type of the edge that connects the user node to the concept node.

18. One or more computer-readable non-transitory storage media embodying software that is operable when executed to:

retrieve, by one or more of the processors from one or more computer storage media, user-concept scores for a first set of users of a plurality of users, wherein the user-concept scores are associated with previous social network activities of the first set of users of the plurality of users, and wherein each user-concept score is associated with a user-concept pair that comprises a first user from the first set of users and a concept from a plurality of concepts;

generate, by one or more of the processors, a data structure comprising a concept matrix Q based on the accessed user-concept scores of the first set of users, wherein the concept matrix Q comprises a plurality of concept trait vectors corresponding to the plurality of concepts, and wherein the concept matrix Q is fixed after being determined;

select, by one or more of the processors and from the data structure, a subset of concepts of the concept matrix Q based on a similarity metric of the plurality of concept trait vectors of the concept matrix Q, wherein the subset of concepts is associated with one or more previous social network activities of one or more users of a second set of users, and wherein the second set of users is discrete from the first set of users;

generate, by one or more of the processors, recommendations based on recommended user-concept scores for a subset of user-concept pairs in the second set of users of the plurality of users and the plurality of concepts based on the subset of concepts of the concept matrix Q determined from the first set of users, wherein the subset of user-concept pairs in the second set of users is a random subset of user-concept pairs, wherein a recommendation-algorithm computes the recommended user-concept scores for a user-concept pair by optimizing an objective function comprising a plurality of predicted rating functions, wherein each predicted rating function is determined using a user score, a concept score, a user-bias value associated with a second user in the second set of users, and a concept-bias value associated with the concept; and send, to one or more client systems of one or more users of the second set of users, the recommendations for one or more concepts based on the recommended user-concept scores for the second set of users.

19. A system comprising: one or more processors; and a memory coupled to the processors comprising instructions executable by the processors, the processors operable when executing the instructions to:

retrieve, by one or more of the processors from one or more computer storage media, user-concept scores for a first set of users of a plurality of users, wherein the user-concept scores are associated with previous social network activities of the first set of users of the plurality of users, and wherein each user-concept score is associated with a user-concept pair that comprises a first user from the first set of users and a concept from a plurality of concepts;

generate, by one or more of the processors, a data structure comprising a concept matrix Q based on the accessed user-concept scores of the first set of users, wherein the concept matrix Q comprises a plurality of concept trait vectors corresponding to the plurality of concepts, and wherein the concept matrix Q is fixed after being determined;

select, by one or more of the processors and from the data structure, a subset of concepts of the concept matrix Q based on a similarity metric of the plurality of concept trait vectors of the concept matrix Q, wherein the subset of concepts is associated with one or more previous social network activities of one or more users of a second set of users, and wherein the second set of users is discrete from the first set of users;

generate, by one or more of the processors, recommendations based on recommended user-concept scores for a subset of user-concept pairs in the second set of users of the plurality of users and the plurality of concepts based on the subset of concepts of the concept matrix Q determined from the first set of users, wherein the subset of user-concept pairs in the second set of users is a random subset of user-concept pairs, wherein a recommendation-algorithm computes the recommended user-concept scores for a user-concept pair by optimizing an objective function comprising a plurality of predicted rating functions, wherein each predicted rating function is determined using a user score, a concept score, a user-bias value associated with a second user in the second set of users, and a concept-bias value associated with the concept; and send, to one or more client systems of one or more users of the second set of users, the recommendations for one or more concepts based on the recommended user-concept scores for the second set of users.

20. The method of claim 1, wherein the concept matrix Q comprises a plurality of concept-score vectors Q(i) for each concept i of the plurality of concepts, wherein each concept i is associated with a user-bias vector $B_u(u)$.

21. The method of claim 1, wherein the concept matrix Q is based on a ratings matrix R representing the user-concept scores for the first set of users.

22. The method of claim 21, wherein the concept matrix Q is determined using distributed stochastic gradient descent (DSGD).

23. The method of claim 1, wherein the concept matrix Q is fixed and used to calculate a user matrix P by applying distributed stochastic gradient descent (DSGD) to an optimization process of a matrix factorization.

* * * * *